United States Patent [19]
Winkler

[11] 3,755,058
[45] Aug. 28, 1973

[54] CARPET SEAMING TAPE

[75] Inventor: Alexander Winkler, North Hollywood, Calif.

[73] Assignee: Bruck Industries, Inc., Los Angeles, Calif.

[22] Filed: June 11, 1970

[21] Appl. No.: 45,432

[52] U.S. Cl.............. 161/88, 156/219, 156/244, 156/295, 161/92, 161/93, 161/146, 161/167
[51] Int. Cl............................................. B32b 15/02
[58] Field of Search .............. 260/37, 41; 161/88, 161/89, 92, 94, 95, 146, 252, 166, 51, 167, 50, 93; 16/16; 156/90, 148, 244, 295, 219

[56] References Cited
UNITED STATES PATENTS

| 3,485,704 | 2/1969 | Clymin.................. 161/146 X |
| 3,471,355 | 10/1969 | Truesdell................ 161/166 X |
| 3,400,038 | 9/1968 | Burgess................... 161/50 |
| 3,389,045 | 6/1968 | Jones et al............. 161/166 |
| 3,000,754 | 9/1961 | Zentmyer............... 161/166 X |

Primary Examiner—William J. Van Balen
Attorney—Herzig and Walsh

[57] ABSTRACT

A carpet seaming tape comprising a tape base with yarns thereon and having a layer of adhesive thereover with a plurality of spaced apart rows of adhesive formed thereon and extending longitudinally along the tape. The yarns have a heat sealant emulsion rolled onto their backs. The layer and rows of adhesive are melted upon the application of heat, and the heat sealant maintains the adhesive above the tape base so as to be available for securement to the carpet. The backs of two adjacent portions of carpet are then pressed against the tape and are bonded thereto providing a seamless appearance.

8 Claims, 5 Drawing Figures

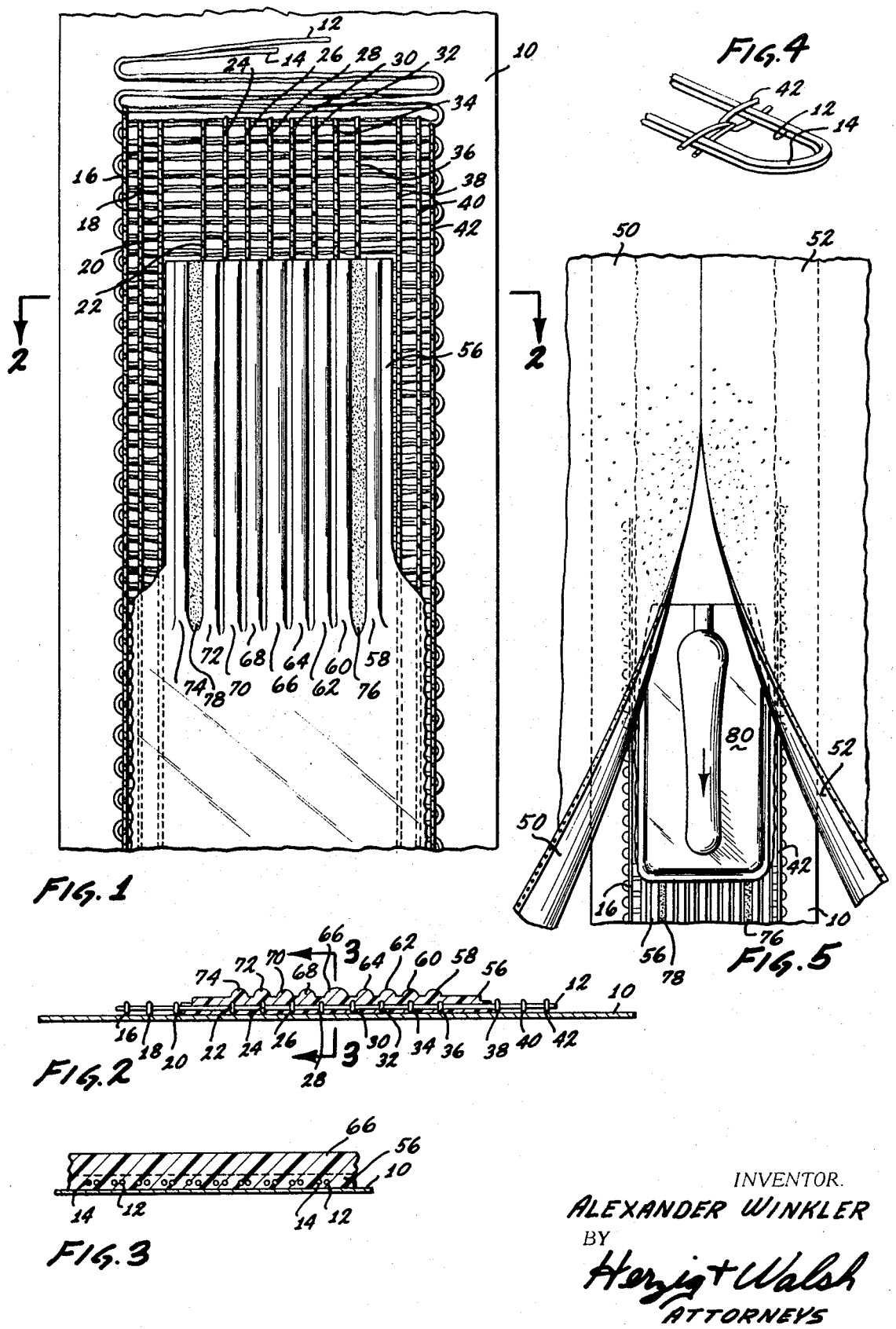

CARPET SEAMING TAPE

SUMMARY OF THE INVENTION

This invention relates to carpet seaming for joining the edges of carpeting to provide a seamless appearance on the upper face.

More particularly, the present invention relates to thermoplastic or hot-melt carpet seaming tapes for the purpose of joining the edges of carpeting. These tapes are commonly known as iron-on tapes in which the thermoplastic or hot-melt adhesive is initially applied to the tape and is allowed to solidify thereon and thereby adhere to the tape. Subsequently, the adhesive is melted by heat applied thereto, and the edges of the carpeting are secured to the tape and adhere to it after the adhesive has solidified.

Many types of tape have been used for joining the edges of carpeting from below, but most of these have had inherent problems. With some of these tapes, the carpet above the tape had unsightly stains from the adhesive. Other tapes have had difficulties in not permitting sufficient adherence of the adhesive to the carpeting and to the tape such that a usable and strong joint was not provided. Still other tapes have allowed adhesive through the tape base, required an excessive time for drying of the adhesive, and have not been found practical by carpet installers.

Thermoplastic carpet seaming tape requires that adhesive thereon be remelted just prior to the application of the tape to the backs of the carpet pieces which are to be adhered to the tape in a generally seamless appearance. This remelting is accomplished by utilizing a source of heat such as an electric iron, an electric hot air blower or ultrasonic or electronically generated thermal sources and applying this source of heat progressively along the thermoplastic adhesive layer as the adhesive melts and thereafter applying and pressing the backs of the carpets to be joined onto the tape such that when the adhesive solidifies, it will permanently secure the backs of the pieces of carpet to the tape forming the seam. Difficulties have arisen in this process due to the movement of the heat source along the tape in too rapid a fashion. This results in adhesive that is not properly melted and improper adhesion is obtained, and the seam is incomplete and improper.

Furthermore, prior thermoplastic tapes, such as U.S. Pat. No. 3,485,704 have provided a plurality of spaced apart tracks of adhesive through a series of orifices onto the tape base. In the event that an orifice is clogged, insufficient or no adhesive can flow through the orifice, and the tapes will not have uniform tracks which hinders the efficiency in joining the edges of the carpet. Also, when heat is applied, these tracks are melted down and spread out to occupy the tape base. This is still an inaccurate process inasmuch as the carpet installer cannot ascertain precisely when the adhesive has properly solidified and may apply the heat for too long a period to one area, thereby extending the time involved, or he may not apply enough heat, which results in an improper seam.

Futhermore, the melting of the adhesive generally causes the adhesive to at least partly embed itself into the paper backing which results in insufficient adhesive being available for the bond between the tape and the rug.

The thermoplastic carpet seaming tape of the present invention provides a layer of solidified adhesive adhering to one side of the tape and having thereon a plurality of rows of solidified adhesive spaced apart from each other and connected by the layer. Between several of the rows, an ink or dye of a bright color such as red may be utilized. By the use of this ink or dye, it is possible for the carpet installer to know when the adhesive has been properly solidified by the fading of the bright colored strips.

It is a principal object of the present invention to provide a carpet seaming tape capable of rapid usage and which is free from the objectional features of prior carpet joining tapes.

Still another aim of the present invention is to provide a carpet seaming tape which is characterized by its high efficiency and reliability in operation and which is compact and economical in construction.

Yet another advantage of the present invention is to provide a carpet seaming tape which maintains all the adhesive available for the seaming operation, and no loss of adhesive is encountered.

Further objects and additional advantages of the invention will become apparent from the following description and annexed drawings wherein:

FIG. 1 is a top plan view of a piece of the carpet seaming tape in accordance with the invention showing the usage thereof;

FIG. 2 represents a section on line 2—2 of FIG. 1;

FIG. 3 represents a section on line 3—3 of FIG. 2;

FIG. 4 represents the interconnection between the transverse and longitudinal length running yarns; and FIG. 5 represents a top plan view of the tape as it is applied to pieces of carpet during its installation.

DESCRIPTION OF THE PREFERRED EMBODIMENT

Referring now to FIG. 1, a backing strip of paper 10 which is the tape base and is made of suitable paper stock such as crepe paper is shown having two sets of generally untwisted multifilament seaming yarns 12 and 14 which are typically of a strong textile thread or fiberglass. The yarns 12 and 14 are extended back and forth transversely of the paper strip 10 and have stitched thereto a plurality of longitudinally extending chain stitched yarns 16, 18, 20, 22, 24, 26, 28, 30, 32, 34, 36, 38, 40, and 42 as more particularly shown in FIG. 2. Each of these stitches embraces and is fastened to seaming yarns 12 and 14.

The transverse seaming yarns 12 and 14 are comprised of generally soft twisted bundles of filaments which have little or no extensibility, a high tensile stress, and high dimensional stability and are typically fiberglass or synthetic filaments as for example rayon or nylon. These yarns are utilized to reinforce the carpet seam against transverse separation.

The longitudinal yarns 16 through 42 are typically twisted yarns and need not have any great tensile strength or dimensional stability, since the usage of these yarns is primarily to envelope and secure all of the transverse yarns to the tape base.

After the transverse seaming yarns 12 and 14 and the longitudinal yarns 16 through 42 have been interwoven, a polyvinyl acetate emulsion is rolled on to the back of the yarns, and the assembly is then placed on the tape base 10. This emulsion prevents the yarns from sliding around on the paper and acts as a heat sealant in a manner which will be explained below.

To aid the carpet installer, the two center longitudinal yarns 28 and 30 are preferably dyed a distinctive color such as black to distinguish them from the other undyed longitudinal yarns 16 through 26 and 32 through 42. These two dyed longitudinal chains 28 and 30 serve to aid in centering the pieces of carpet 50 and 52 that are to be joined along the center line of the tape. It is noted that the two dyed yarns 28 and 30 show through the generally transparent or translucent layer 56 of the solidified thermoadhesive, during the seaming operation.

In order to provide a layer of adhesive 56 on tape base 10, the adhesive is fed through an elongated slot so that there is a controlled, uniform, metered mass of adhesive which is extruded onto the tape. This layer embeds the yarns 12 and 14 and adheres to the exposed portions of the tape base 10 therebetween and to the polyvinyl acetate emulsion to form a lock between the filaments as well as a surface bond to the emulsion and tape base. The adhesive layer must fully embed the yarns in order to prevent the yarns from pulling away from the adhesive under the application of pressure by tunneling.

To form longitudinal rows 58, 60, 62, 64, 66, 68, 70, 72, and 74 after layer 56 is extruded onto the tape base, the layer is embossed with a chilled roller. The embossing roller is chilled to a temperature close to zero degrees Fahrenheit so as to prevent adhesive from sticking to it during the embossing process. The roller also provides rows that are uniform and which insure uniform melting during the carpet seaming process.

The center row 66 is provided between the two center marking longitudinal yarns 28 and 30 while four of the other eight rows 58 to 64 are on one side of the center, and the other four rows 68 to 74 are on the other side of the center as more clearly shown in FIG. 2.

FIG. 3 more clearly shows the relationship between the tape base, the transverse yarns 12 and 14, the layer of adhesive 56, and the row of adhesive 66. The transverse yarns are shown embedded in the layer 56 of the adhesive that is originally extruded onto the tape base 10. After adhesive layer 56 is extruded onto the base, adhesive row 66 is embossed thereon. Thus, it can be seen that adhesive row 66 and the other rows more clearly shown in FIG. 2 are formed by embossing the layer 56 with a chilled roller as previously described.

The interweaving of the transverse yarns 12 and 14 with the longitudinal yarns for example 42 is shown in detail in FIG. 4. These yarns are interwoven to a large degree and minimize the possibility of movement of the yarns during the initial placement of the adhesive on the tape base 10. Furthermore, these interwoven yarns which are coated on their backs by a polyvinyl acetate film minimize the possibility of movement of the adhesive during the remelting and resolidification of the adhesive at the time of use by the carpet installer.

The thermoplastic utilized must have a high adhesive strength and suitable flexibility at ambient temperatures, have a low cracking temperature and a suitable softening and binding temperature. Examples of such a thermoplastic adhesive are the co-polymer based adhesives of the Bordon Chemical Company known as HA-5423 or HA-5428, the polyethelene adhesive made by the Eastman Chemical Company of Kingsport, Tennessee under its trademark DISTALBOND or more paritcularly its DISTALBOND M-8 which is a polyethelene with a plasticizor and an antioxident and which is a solid having suitable slight flexibility at all normal ambient temperatures and has a softening temperature of the order of 210° Fahrenheit and whose optimum melting temperature is of the order of 375° to 425° Fahrenheit.

The foregoing examples of the thermoplastic adhesive are merely illustrative, and other suitable thermoadhesives may be used. However, a preferable plastic adhesive is one which is transparent or translucent.

After the layer 56 and the rows 58 through 74 have been placed on the tape base 10, it is possible to color areas 76 and 78 with an ink or dye of a bright color such as red in order to facilitate later usage by the carpet installer. The coloring material is typically a fugitive ink or dye such as type "B" red marking ink made by Independent Ink Company of Gardena, California. This ink or dye comprises particles or pieces of pigmentation and the solvent. Typically, only a limited amount of the ink or dye is utilized in areas 76 and 78.

When the carpet installer commences to utilize a heat producing device such as iron 80 shown in FIG. 5, he is assured that the adhesive has been properly melted at the time when he can no longer see the colored area 76 and 78. When the adhesive represented by layer 56 and by rows 58 through 74 has melted by the use of an iron, the ink or dye spreads out and fades; and the color disappears at the time when the adhesive is properly melted to indicate the suitable time to join the edges of two pieces of carpet typically shown at 50 and 52 in FIG. 5.

In order to use the adhesive seaming tape of the present invention, the tape is laid on the floor or on top of the carpet padding with the adhesive side facing upwards; and the carpet pieces 50 and 52 are laid over the tape face up such that their edges are generally above the central row 66 or between the two center marking longitudinal yarns 28 and 30. This insures that the carpet has been centered over the tape.

Thereafter as shown in FIG. 5, the edges of the carpet are folded back, and electric iron 80 is applied to the adhesive layer and rows until they melt into each other as indicated when the colored areas 76 and 78 have faded and can no longer be seen. Then, the iron is moved to melt a new area of the tape. Other heat producing sources can be utilized but are not feasible to cause the colored areas to fade.

As the adhesive is melted, the polyvinyl acetate emulsion on the bottom of the yarns also responds to the heat source by providing a barrier between the adhesive and the tape base. In this manner, the emulsion acts as a sealant and prevents the adhesive from embedding itself into the tape base and allows all the adhesive to be available for the bonding process between the tape and the carpet.

When the heat is applied, melting of the adhesive occurs in three directions. As the rows uniformly melt and the thin bottom layer melts, heat is conveyed by convection through the layer from one row to another.

As the adhesive melts, the pieces 50 and 52 of the carpet are progressively placed back onto the tape and the adhesive layer until the seam is thereby completed. As the carpet pieces are placed into location on the tape, they are pressed down onto the adhesive so as to insure a good bonding of the back surfaces of the carpet pieces to the tape.

After the adhesive has dried, the carpet may be stretched longitudinally or transversely into place; and the seam and the tape will not be ruptured.

From the foregoing, those skilled in the art will readily understand and appreciate the nature and construction of the invention and the manner in which it achieves and realizes all of the objects and advantages as set forth in the foregoing as well as the many additional advantages that are apparent from the detailed description.

The foregoing disclosure is representative of a preferred form of the invention and is to be interpreted in an illustrative rather than a limiting sense, the invention to be accorded to the full scope of the claims appended hereto.

What is claimed is:

1. A thermoadhesive carpet seaming tape including a thin and flexible tape, and a layer of solidified adhesive, said layer having embossed thereon rows of solidified adhesive spaced apart from each other such that when heat is applied to said solidified adhesive, said rows and said layer will melt into a continuous layer, thereby placing the tape in condition to be bonded to the backs of pieces of carpet which are secured thereto, said thin and flexible tape including a plurality of filaments extending transversely on said tape, said layer of solidified adhesive embedding said filaments.

2. A thermoadhesive carpet seaming tape according to claim 1, further including a plurality of yarns extending longitudinally along said tape.

3. A thermoadhesive carpet seaming tape according to claim 2, wherein two of said plurality of yarns are of a distinctive color to indicate the center of said tape.

4. A thermoadhesive carpet seaming tape according to claim 1, wherein the adhesive layer between two sets of rows is of a bright color whereby proper heating of said adhesive causes said bright color to spread out and fade.

5. A thermoadhesive carpet seaming tape according to claim 1, further including an emulsion applied to the back of said yarns.

6. A thermoadhesive carpet seaming tape having means to visually indicate its readiness to make an effective bond with the backs of the abutting pieces of carpet, said carpet seaming tape comprising a relatively flexible, elongated member having high tensile strength and having solidified flexible thermoplastic adhesive material adhered to one side of it along its length, said thermoplastic adhesive having at least one relatively elongated, narrow line of a fugitive coloring dye therein, said thermoplastic adhesive being adapted to melt upon the application of heat and said fugitive dye being of a type that the color disappears upon melting of the thermoplastic adhesive to indicate to an operator the speed at which to apply the tool for melting the adhesive.

7. A tape as in claim 6, wherein said thermoplastic adhesive is in the form of a relatively thin continuous layer having elongated, parallel ribs formed thereon.

8. A thermoadhesive carpet seaming tape including a thin and flexible tape, and a layer of solidified adhesive adhered to one side of said thin and flexible tape, said layer having embossed thereon rows of solidified adhesive spaced apart from each other such that when heat is applied to said solidified adhesive, said rows and said layer will melt into a continuous layer, thereby placing the tape in condition to be bonded to the backs of pieces of carpet which are secured thereto, a plurality of yarns extending longitudinally along said tape, said layer of solidified adhesive being mounted on top of said yarns, said adhesive layer adhering to said transverse and longitudinal yarns and to said tape, an emulsion applied to the back of said yarns, said emulsion being a polyvinyl acetate utilized as a heat sealant such that when said solidified adhesive melts, said emulsion prevents said adhesive from embedding into said thin and flexible tape.

* * * * *